(12) United States Patent
Gao

(10) Patent No.: US 8,667,893 B2
(45) Date of Patent: Mar. 11, 2014

(54) SIDE DOOR SWITCHING MECHANISM FOR A TOASTER

(75) Inventor: Shangqian Gao, Zhangzhou (CN)

(73) Assignee: Tsann Kuen (Zhangzhou) Enterprise Co., Ltd., Zhangzhou (CN)

( * ) Notice: Subject to any disclaimer, the term of this patent is extended or adjusted under 35 U.S.C. 154(b) by 225 days.

(21) Appl. No.: 13/195,126

(22) Filed: Aug. 1, 2011

(65) Prior Publication Data

US 2012/0024165 A1   Feb. 2, 2012

(30) Foreign Application Priority Data

Aug. 2, 2010   (CN) .................. 2010 2 0278655 U

(51) Int. Cl.
*A47J 37/08*   (2006.01)
(52) U.S. Cl.
USPC ........................................................... 99/393
(58) Field of Classification Search
USPC ........... 99/385, 386, 387, 388, 389, 390, 391, 99/392, 393; 126/190, 194, 197; 292/26, 292/30, 39, 51, 112, 137, 142, 160, 172, 292/199, 279, 280, 303
See application file for complete search history.

(56) References Cited

U.S. PATENT DOCUMENTS

| | | | | |
|---|---|---|---|---|
| 1,639,385 A | * | 8/1927 | Reichold | 99/393 |
| 2,865,281 A | * | 12/1958 | Chivers | 99/339 |
| 6,868,703 B2 | * | 3/2005 | Molzer | 70/210 |
| 2003/0172814 A1 | * | 9/2003 | Arnedo et al. | 99/327 |

* cited by examiner

*Primary Examiner* — Geoffrey S Evans
*Assistant Examiner* — Brandon Harvey
(74) *Attorney, Agent, or Firm* — Rabin & Berdo, P.C.

(57) ABSTRACT

The patent of invention is provides with a side door switching mechanism for a toaster, which includes two side doors, a side door open lock catch, a side door closing lifting device and a timing electromagnetic controller. The side door can be closed automatically when the lifting board presses the side door shaft. The side door is opened by press the open push rod with the lock catch lifts up by the gear effect of the gear lever. The patent of invention presents the user hurt by directly contacting the side door.

10 Claims, 6 Drawing Sheets

US 8,667,893 B2

SIDE DOOR SWITCHING MECHANISM FOR A TOASTER

FIELD OF THE INVENTION

The invention relates to a side door switching mechanism, especially to a side door switching mechanism for a toaster.

BACKGROUND OF THE INVENTION

To put a toast to an existing toaster to bake it or to take it from the toaster, the user opens the side doors of the toaster by controlling the handle or the button of the toaster. The handle or the button is disposed in the side doors. The closing of the side doors of the toaster also occurs with the button or handle. But the temperature of the side doors of the existing toaster rises with the rising of the temperature of the toaster. So the user may be hurt by the high temperature of the side door when opening or closing the side door.

SUMMARY OF THE INVENTION

In some embodiments, a side door switching mechanism for a toaster including pivots is provided. The side door switching mechanism comprises first and second side doors having lower ends pivotably connected to the toaster by the pivots. First and second sharing shafts are provided. First and second thermal rings are disposed on the first and second sharing shafts respectively. A side door open lock catch includes lock catches to lock the first and second side doors. The lock catches are disposed in the toaster. The lock catches have a first lock catch for locking the first side door, and a second lock catch for locking the second side door. A hook of the first lock catch is connectable to the first thermal ring, and a hook of the second lock catch is connectable to the second thermal ring. The side door open lock catch also includes a gear structure disposed in the toaster. The lock catches connect to the gear structure. The gear structure includes a first joint gear lever and a second joint gear lever joined together. The first joint gear lever has an end that is connectable to the first lock catch along the first sharing shaft. The second joint gear lever has an end connectable to the second lock catch along the second sharing shaft. The side door switching mechanism also includes a side door closing lifting device which includes a lifting board slidingly connected to a front body of the toaster, and side door shafts fixed to bottoms of the first and second side doors. The side door shafts are disposed under the lifting board and the lifting board is placed against the side door shafts. A reset control device is disposed in the toaster and connects to the lifting board.

Compared to the existing art, the user pushes the closing push rod with the lifting board pressing the side door pivot to close the side doors automatically in the present invention. The lock catch is lifted by the effect of the gear lever when the open push rod is pressed. Then the side door is opened. The closing push rod and the open push rod are disposed far away from the side door, so that the components would not be affected by the temperature of the toaster, the components are adiabatic. The invention prevents the user from hurting themselves by the side door.

BRIEF DESCRIPTION OF THE DRAWINGS

The invention will be further described with the drawings and the embodiment.

Figure 1:
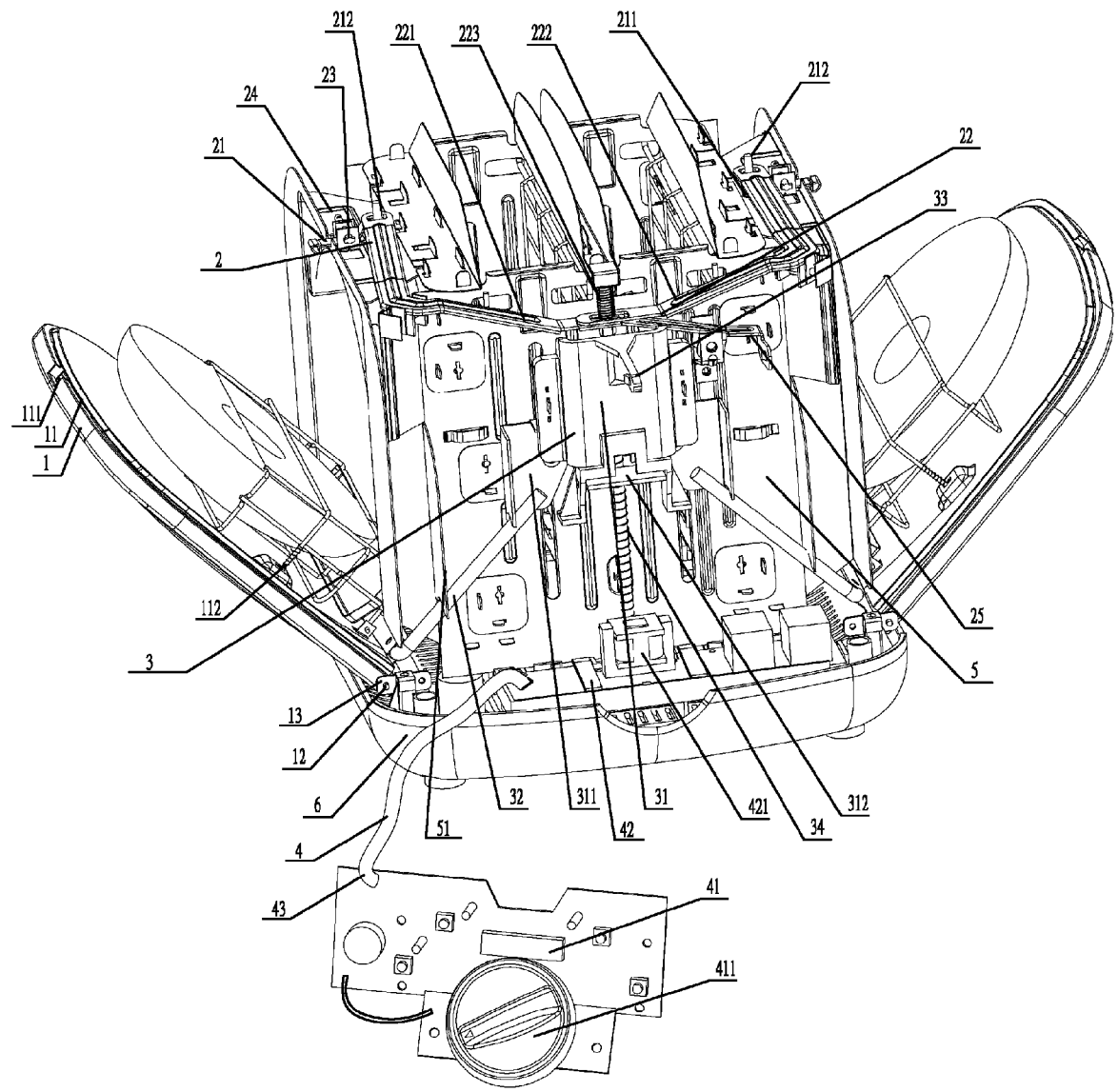
FIG. 1 illustrates the structure of the invention when the side door is open.

In the figures, 1—side door, 11—side door thermal baffle, 111—groove, 112—grid spring, 12—pivot, 13—pivot fixing piece, 2—side door open lock catch, 21—lock catch, 211—lock catch spring, 212—lock catch spring shaft, 22—gear structure, 221—left gear lever, 222—right gear lever, 223—lever spring, 23—sharing shaft, 24—thermal ring, 25—open push rod, 3—side door close lifting device, 31—lifting board, 311—side door push piece, 312—electromagnetic suction piece, 32—side door shaft, 33—closing push rod, 34—lifting spring, 4—timing electromagnetic controller, 41—timing controller, 411—knob, 42—electromagnetic device, 421—electromagnet, 43—power control line, 5—front body, 51—stop, 6—base

DETAILED DESCRIPTION OF THE EMBODIMENTS

The invention is provided with a side door switching mechanism for a toaster, which includes:

two side doors 1, the bottom of which pivot connect to the two side surfaces of the toaster separately by the pivots 12, two side door thermal baffles 11 are disposed in the inner surface of the side door. A groove 111 is disposed on the top of the thermal baffle 11, and the groove 111 works with the hook of the lock catch 21, the hook of the lock catch 21 could insert to the groove 111; the pivot connects to the side door by hole clearance, and the pivot is positioned by the spring and the convex (not shown in the figures); the side door pivot 32 is fixed to the side door 1 by bolts; the inner of the thermal baffle is disposed with grid spring 112 to open the side door;

A side door open lock catch device 2, which includes two lock catch 21 to lock the two side door and a gear structure 22. The lock catch 21 connects to the gear structure 22, which drives the lock catch 21 to lock the lock catch 21 to the groove 111 or release the lock catch 21 from the groove 111; the gear structure 22 of the side door open lock catch device 2 includes two gear levers 221, 222, which joints together; the end of the gear levers 221,222 connect to the lock catch 21 in a sharing shaft 23. Thermal ring 24 is disposed in the sharing shaft 23, and the lock catch 21 pivot connects to the thermal ring 24 by the sharing shaft 23. A lock catch spring 211 is disposed under the lock catch 21 to reset the lock catch 21; a gear spring 223 is disposed at the joint of the two gear lever 221,222 to reset the gear lever; an open push rod 25 is disposed at the joint of the two gear lever 221,222; Side door lifting device 3, which includes a lifting board 31 and two side door shaft 32 fixed to the bottom of two the side doors 1. The lifting board 31 sliding connects to the front body 5 of the toaster. The side door shaft 32 are disposed under the lifting board 31, a closing push rod 33 connects to the lifting board 31. The bottom of the lifting board 31 extends down to form a side door push piece 311 to press the side door shaft; the bottom of the lifting board is disposed with a lifting spring 34 to reset the lifting board; the two sides of the front body 5 is disposed with a stop 51 to limit the pivot angle of the side door shaft.

The timing electromagnetic controller 4 includes a timing controller 41 and an electromagnetic device 42. The electromagnetic device 42 is disposed in the base 6 of the toaster. The timing controller 41 of the timing electromagnetic controller 4 is disposed with a knob 411 to select the bake time. The timing controller 41 is disposed with an electromagnet 421 which is magnetized when powered; an suction piece 312 (or a magnetic piece) is fixed at the bottom of the lifting board 31, the suction piece 312 can stick to the electromagnet 421.

Figure 3:
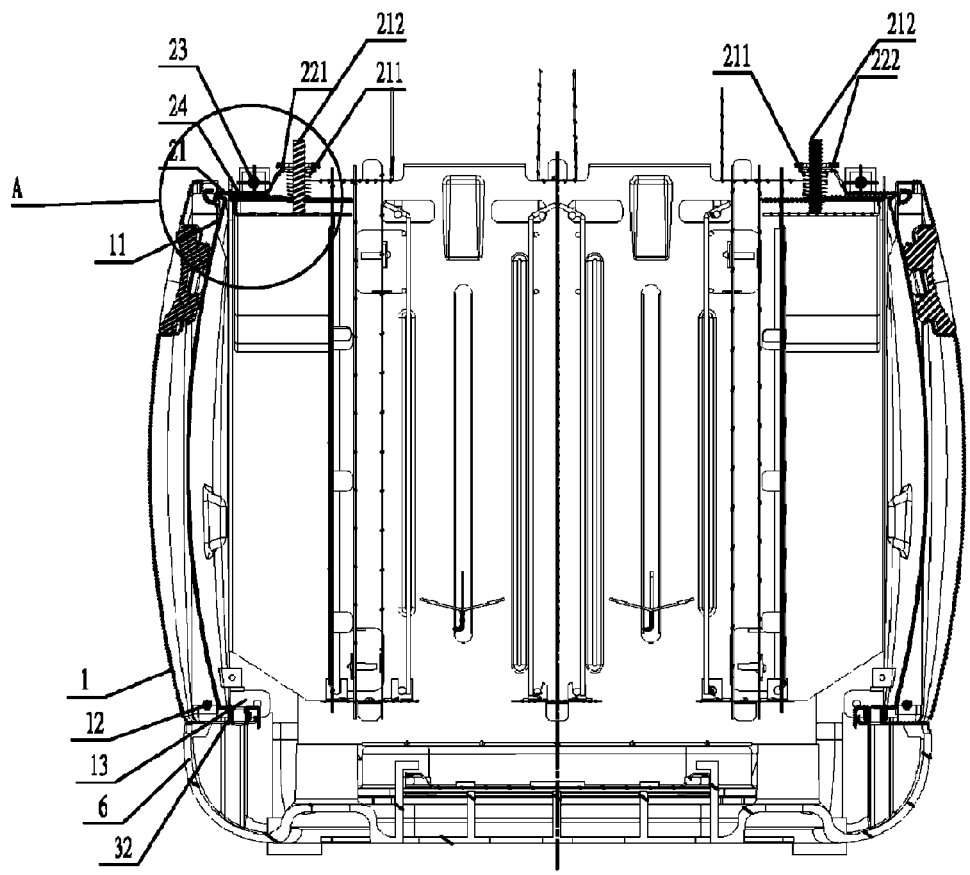
FIG. 3 illustrates the cross section of the invention when the side door is closed.
Figure 4:
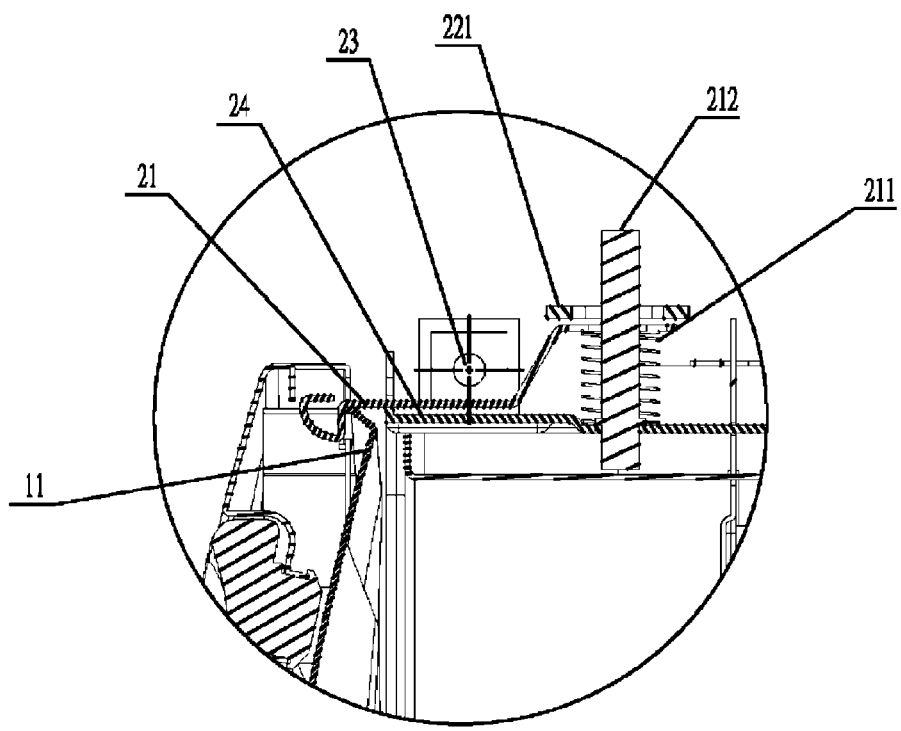
FIG. 4 illustrates the partial enlargement of A part in the FIG. 3.

Refer to the FIG. 1, when the side door is open, the food to be baked is put to the toaster. Power the toaster and turn the knob 411 of the timing controller 41 to the bake time, then push the closing push rob 33 down. The lifting board 31 slides downward, and the side door shaft 32 pivots down with the effect of the side door push piece 311 of the lifting board 31. The side door shaft 32 drives the two side doors 1 pivot around the pivot 12, as shown in the FIG. 3 and the FIG. 4. The hook of the lock catch 21 inserts to the groove on the top of the side door thermal baffle 11, and the side doors 1 are locked by the lock catch 21. So is the close of the side doors 1. The electromagnet 421 in the base 6 is powered and magnetized. And the suction piece 312 sticks to the electromagnet 421. The lifting board 31 will rest at the bottom of the front body 5 against the elastic force of the lifting spring 34.

Figure 2:
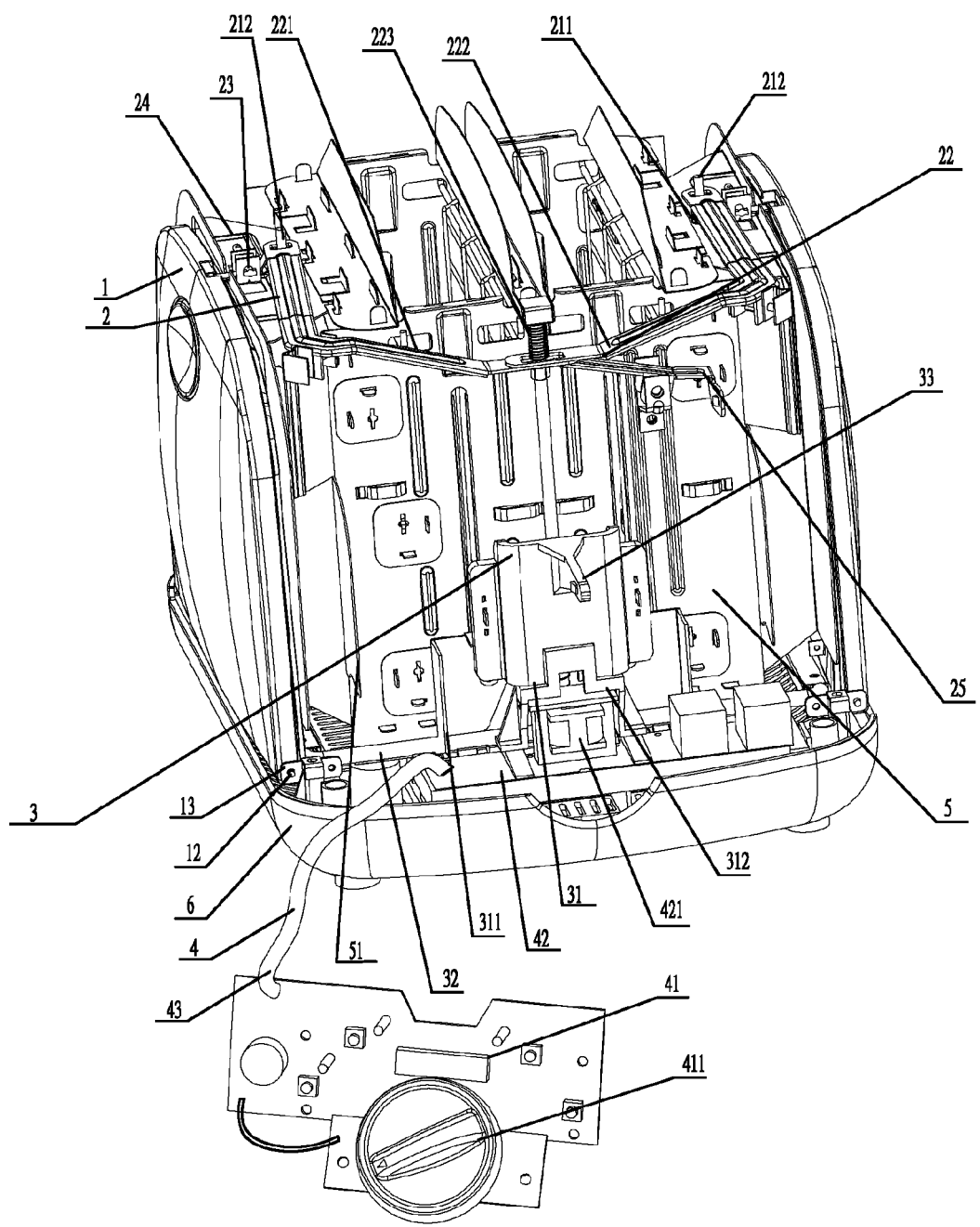
FIG. 2 illustrates the structure of the invention when the side door is closed.
Figure 5:
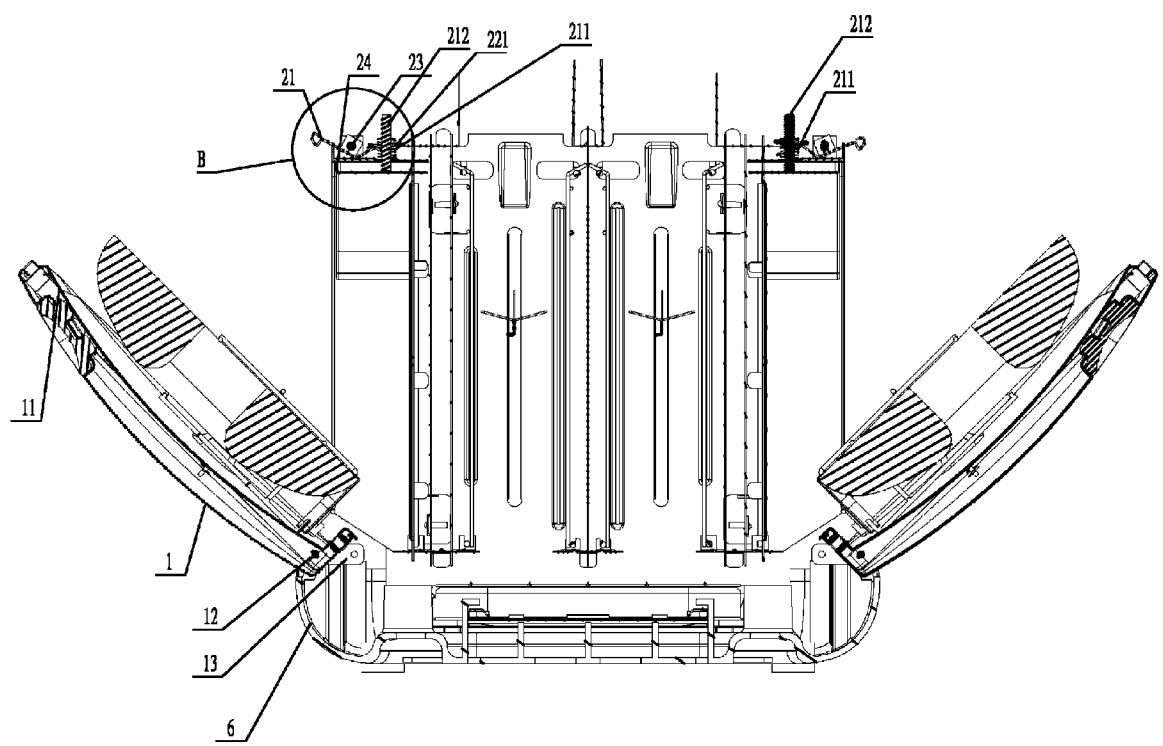
FIG. 5 illustrates the cross section of the invention when the side door is open.
Figure 6:
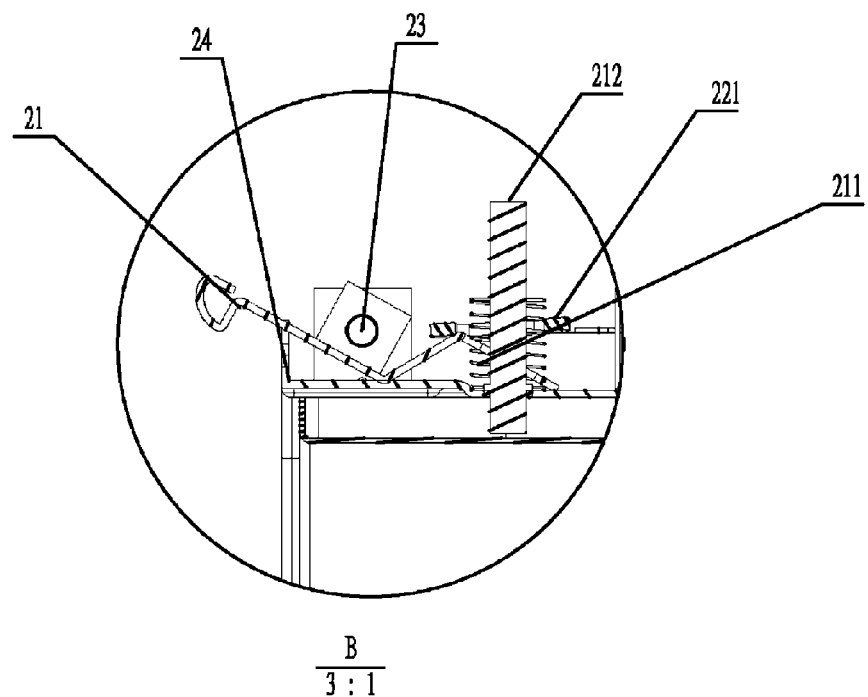
FIG. 6 illustrates the partial enlargement of B part in the FIG. 5.

Refer to the FIG. 2, when the set bake time is up, the power of the electromagnet 421 is cut off automatically by the timing controller 41. The electromagnet 421 loses its magnet, so that the lifting board 31 lifts up until back to its first position with the elastic force of the lifting spring 34. To take the food from the toaster, push the open push rod 25. The push rod 25 drives the left gear lever 221 and the right gear lever 222 lifting up against the elastic force of the lever spring 223, as shown in the FIG. 5 and FIG. 6. The lock catch 21 turns up about the sharing shaft 23 against the elastic force of the lock catch spring 211, so that the hook of the lock catch 21 release from the groove 111 of the thermal baffle 11. The side door 4 is open in the gravity itself and the grid spring 112. The user takes the food from the toaster.

Although the invention has been described with reference to the preferred embodiments thereof for carrying out the invention, it is apparent to those skilled in the art that a variety of modifications and changes may be made without departing from the scope of the present invention which is intended to be defined by the appended claims.

What is claimed is:

1. A side door switching mechanism for a toaster including pivots, the side door switching mechanism comprising:
    first and second side doors having lower ends pivotably connected to the toaster by the pivots;
    first and second sharing shafts;
    first and second thermal rings disposed on the first and second sharing shafts respectively;
    a side door open lock catch including
        lock catches to lock the first and second side doors, the lock catches being disposed in the toaster, the lock catches having a first lock catch for locking the first side door, and a second lock catch for locking the second side door, a hook of the first lock catch being connectable to the first thermal ring, a hook of the second lock catch being connectable to the second thermal ring, and
        a gear structure disposed in the toaster, the lock catches connecting to the gear structure, the gear structure including a first joint gear lever and a second joint gear lever joined together, the first joint gear lever having an end being connectable to the first lock catch along the first sharing shaft, the second joint gear lever having an end being connectable to the second lock catch along the second sharing shaft;
    a side door closing lifting device including
        a lifting board slidingly connected to a front body of the toaster, and
        side door shafts fixed to bottoms of the first and second side doors, the side door shafts being disposed under the lifting board, the lifting board being placed against the side door shafts; and
    a reset control device disposed in the toaster and connecting to the lifting board.

2. The side door switching mechanism for the toaster according to the claim 1, further comprising a grid spring to open the first and second side doors and being disposed in an inner side of the first and second side doors.

3. The side door switching mechanism for the toaster according to the claim 1, wherein grooves are disposed on tops of the first and second side doors to operate with the first and second lock catches.

4. The side door switching mechanism for the toaster according to the claim 1, further comprising lock catch springs disposed between the first and second lock catches and the toaster to reset the first and second lock catches.

5. The side door switching mechanism for the toaster according to the claim 1, further comprising a closing push rod fixed to the lifting board,
    wherein the toaster including stops, side surfaces of the front body of the toaster are disposed with the stops to limit pivot angles of the side door shafts.

6. The side door switching mechanism for the toaster according to the claim 1, further comprising a lifting spring to reset the lifting board, the lifting spring being disposed under the lifting board.

7. The side door switching mechanism for the toaster according to the claim 6, wherein the reset control device includes a timing electromagnetic controller, the timing electromagnetic controller includes
    an electric control line,
    a timing controller, and
    an electromagnetic device, the timing controller connecting to the electromagnetic device by the electric control line, and the electromagnetic device being disposed at a bottom of the toaster.

8. The side door switching mechanism for the toaster according to the claim 7, wherein the electromagnetic device is disposed with an electromagnet, which is magnetized when the electromagnet is powered, and
    further wherein the side door switching mechanism comprises a magnetic piece disposed at the bottom of the lifting board, and the magnetic piece being stickable to the electromagnet.

9. The side door switching mechanism for the toaster according to the claim 1, wherein the first and second joint gear levers include a joint,
    the side door switching mechanism further comprising:
        a gear spring, the joint being disposed with the gear spring to reset the first and second joint gear levers; and
        an open push rod disposed at the joint of the first and second joint gear levers.

10. The side door switching mechanism for the toaster according to the claim 2, wherein grooves are disposed on tops of the first and second side doors to operate with the first and second lock catches.

* * * * *